US010726045B2

(12) United States Patent
Sturtivant

(10) Patent No.: US 10,726,045 B2
(45) Date of Patent: Jul. 28, 2020

(54) RESOURCE-EFFICIENT RECORD PROCESSING IN UNIFIED AUTOMATION PLATFORMS FOR ROBOTIC PROCESS AUTOMATION

(71) Applicant: Accenture Global Solutions Limited, Dublin (IE)

(72) Inventor: Alan Sturtivant, Caerphilly (GB)

(73) Assignee: Accenture Global Solutions Limited, Dublin (IE)

( * ) Notice: Subject to any disclaimer, the term of this patent is extended or adjusted under 35 U.S.C. 154(b) by 253 days.

(21) Appl. No.: 15/925,237

(22) Filed: Mar. 19, 2018

(65) Prior Publication Data
US 2019/0286736 A1   Sep. 19, 2019

(51) Int. Cl.
*G06F 16/27* (2019.01)
*G06F 16/23* (2019.01)
*G06F 16/22* (2019.01)
*G05B 19/042* (2006.01)

(52) U.S. Cl.
CPC ........... *G06F 16/27* (2019.01); *G05B 19/042* (2013.01); *G06F 16/2255* (2019.01); *G06F 16/2358* (2019.01)

(58) Field of Classification Search
CPC .. G06F 16/27; G06F 16/2255; G06F 16/2358; G06F 16/273; G05B 19/042
USPC .......................................................... 707/625
See application file for complete search history.

(56) References Cited

U.S. PATENT DOCUMENTS

| 2004/0003005 | A1* | 1/2004 | Chaudhuri | G06F 16/215 |
| 2008/0097748 | A1* | 4/2008 | Haley | G06F 17/2785 704/9 |
| 2013/0103653 | A1* | 4/2013 | Carson | G06F 16/2358 707/690 |
| 2014/0156646 | A1* | 6/2014 | Brust | G06F 3/0481 707/722 |
| 2015/0143064 | A1* | 5/2015 | Bhargava | G06F 11/1451 711/162 |
| 2016/0094667 | A1* | 3/2016 | Jani | H04L 67/16 709/202 |
| 2016/0191509 | A1* | 6/2016 | Bestler | G06F 16/2255 713/163 |

(Continued)

OTHER PUBLICATIONS

EP Extended Search Report in European Application No. 19162953, dated Aug. 1, 2019, 9 pages.

*Primary Examiner* — Hosain T Alam
*Assistant Examiner* — Nicholas E Allen
(74) *Attorney, Agent, or Firm* — Fish & Richardson P.C.

(57) ABSTRACT

Implementations directed to reducing data flow between an AP, and a RPA platform include receiving, by a platform-specific adapter, a set of data records, providing a data change tuple including an identifier, and a hash value, providing a sub-set of data records from the second set of data records based on comparing hash values of data change tuples to a set of stored hash values, the sub-set of data records including fewer data records than the second set of data records, and each data record in the sub-set of data records including a change indicator, determining, by the platform-specific adapter, a tag for each data record in the sub-set of data records based on a respective change indicator, and transmitting a set of messages to the AP, the set of messages communicating tagged data records of the first set of data records, and the sub-set of data records.

21 Claims, 5 Drawing Sheets

(56) References Cited

U.S. PATENT DOCUMENTS

| | | | |
|---|---|---|---|
| 2017/0006141 A1* | 1/2017 | Bhadra | H04L 67/12 |
| 2017/0052824 A1* | 2/2017 | Sharma | G06Q 10/10 |
| 2017/0083386 A1* | 3/2017 | Wing | G06F 1/30 |
| 2017/0173784 A1* | 6/2017 | Shah | B25J 9/0084 |
| 2017/0228119 A1* | 8/2017 | Hosbettu | G06F 3/0484 |
| 2017/0352041 A1* | 12/2017 | Ramamurthy | G06F 3/04847 |
| 2017/0372227 A1* | 12/2017 | Hosabettu | G06F 3/048 |
| 2018/0011893 A1* | 1/2018 | Kimura | G06F 12/0238 |

* cited by examiner

*FIG. 3B*

350:
| $ID_1$ | INFO | $T_1$ | TYPE |
| $ID_2$ | INFO | $T_2$ | TYPE |
| $ID_3$ | INFO | $T_3$ | TYPE |
| $ID_4$ | INFO | $T_4$ | TYPE |
| $ID_5$ | INFO | $T_5$ | TYPE |
| $ID_6$ | INFO | $T_6$ | TYPE |
| $ID_7$ | INFO | $T_7$ | TYPE |

352:
| $ID_1$ | INFO | $T_1$ | TYPE | TAG |
| $ID_2$ | INFO | $T_2$ | TYPE | |
| $ID_3$ | INFO | $T_3$ | TYPE | |
| $ID_4$ | INFO | $T_4$ | TYPE | TAG |
| $ID_5$ | INFO | $T_5$ | TYPE | |
| $ID_6$ | INFO | $T_6$ | TYPE | TAG |
| $ID_7$ | INFO | $T_7$ | TYPE | |

354:
| $ID_2$ | $HASH_2$ | TYPE |
| $ID_3$ | $HASH_3$ | TYPE |
| $ID_5$ | $HASH_5$ | TYPE |
| $ID_7$ | $HASH_7$ | TYPE |

356:
| $ID_2$ | $HASH_{2-2}$ | TYPE |
| $ID_3$ | $HASH_3$ | TYPE |

| $ID_7$ | $HASH_7$ | TYPE |
| $ID_8$ | $HASH_8$ | TYPE |

358:
| $ID_2$ | U |
| $ID_5$ | C |
| $ID_8$ | D |

RESOURCE-EFFICIENT RECORD PROCESSING IN UNIFIED AUTOMATION PLATFORMS FOR ROBOTIC PROCESS AUTOMATION

BACKGROUND

Robotic process automation (RPA) can be described as the use of software to perform high-volume, repeatable tasks on computer systems. More particularly, RPA includes computer software robots (bots) that are each configured to capture and interpret existing applications to, for example, process a transaction, manipulate data, trigger responses, and/or communicate with other systems. RPA is distinct from automation processes in that RPA is aware of, and can adapt to changing circumstances, exceptions, and new situations. Once an RPA bot has been trained to capture and interpret the actions of specific processes in existing software applications, the bot performs its assigned tasks autonomously. In some examples, RPA can expedite back-office and middle-office tasks in a wide range of industries, which can include, without limitation, manufacturing, health care, telecom, insurance, finance, procurement, supply chain management (SCM), accounting, customer relationship management (CRM), and human resource management (HRM).

Multiple providers provide RPA services through respective RPA platforms. As the number of individual RPA platforms, and the number of bots on respective RPA platforms increase, monitoring, controlling, and managing RPA systems become complex, resource-intensive tasks.

SUMMARY

Implementations of the present disclosure are generally directed to a unified automation platform (UAP) for robotic process automation (RPA). More particularly, implementations of the present disclosure are directed to resource-efficient record processing in UAPs for RPA.

In some implementations, actions include receiving, by a platform-specific adapter of the AP, a set of data records from a RPA platform of a plurality of RPA platforms the AP interacts with, providing, by the platform-specific adapter, and from the set of data records, a first set of data records including tagged data records, and a second set of data records including untagged data records, for each data record in the second set of data records, providing a data change tuple including an identifier, and a hash value, providing a sub-set of data records from the second set of data records based on comparing one or more hash values of data change tuples to a set of stored hash values, the sub-set of data records including fewer data records than the second set of data records, and each data record in the sub-set of data records including a change indicator, determining, by the platform-specific adapter, a tag for each data record in the sub-set of data records based on a respective change indicator, and transmitting, by the platform-specific adapter, a set of messages to the AP, the set of messages communicating tagged data records of the first set of data records, and the sub-set of data records. Other implementations of this aspect include corresponding systems, apparatus, and computer programs, configured to perform the actions of the methods, encoded on computer storage devices.

These and other implementations can each optionally include one or more of the following features: if a hash value of a data record does not match a hash value of a corresponding stored hashed record, the data record is tagged, and is included in the sub-set of data records; comparing hash values of data change tuples to a set of stored hash values includes, for at least one data record, determining that the identifier of the at least one data record is included in the set of stored hash values; the set of data records is received during a cycle, and the set of stored hash values correspond to data records received in an immediately preceding cycle; hash values are provided using a hash function; the platform-specific adaptor is specific to the RPA platform, and the AP communicates with multiple RPA platforms; and a unified automation platform (UAP) includes the AP.

It is appreciated that methods in accordance with the present disclosure can include any combination of the aspects and features described herein. That is, methods in accordance with the present disclosure are not limited to the combinations of aspects and features specifically described herein, but also may include any combination of the aspects and features provided.

The details of one or more implementations of the present disclosure are set forth in the accompanying drawings and the description below. Other features and advantages of the present disclosure will be apparent from the description, drawings, and claims.

BRIEF DESCRIPTION OF DRAWINGS

FIG. 3B depicts example sets of data records.

Like reference numbers and designations in the various drawings indicate like elements.

DETAILED DESCRIPTION

Figure 1:
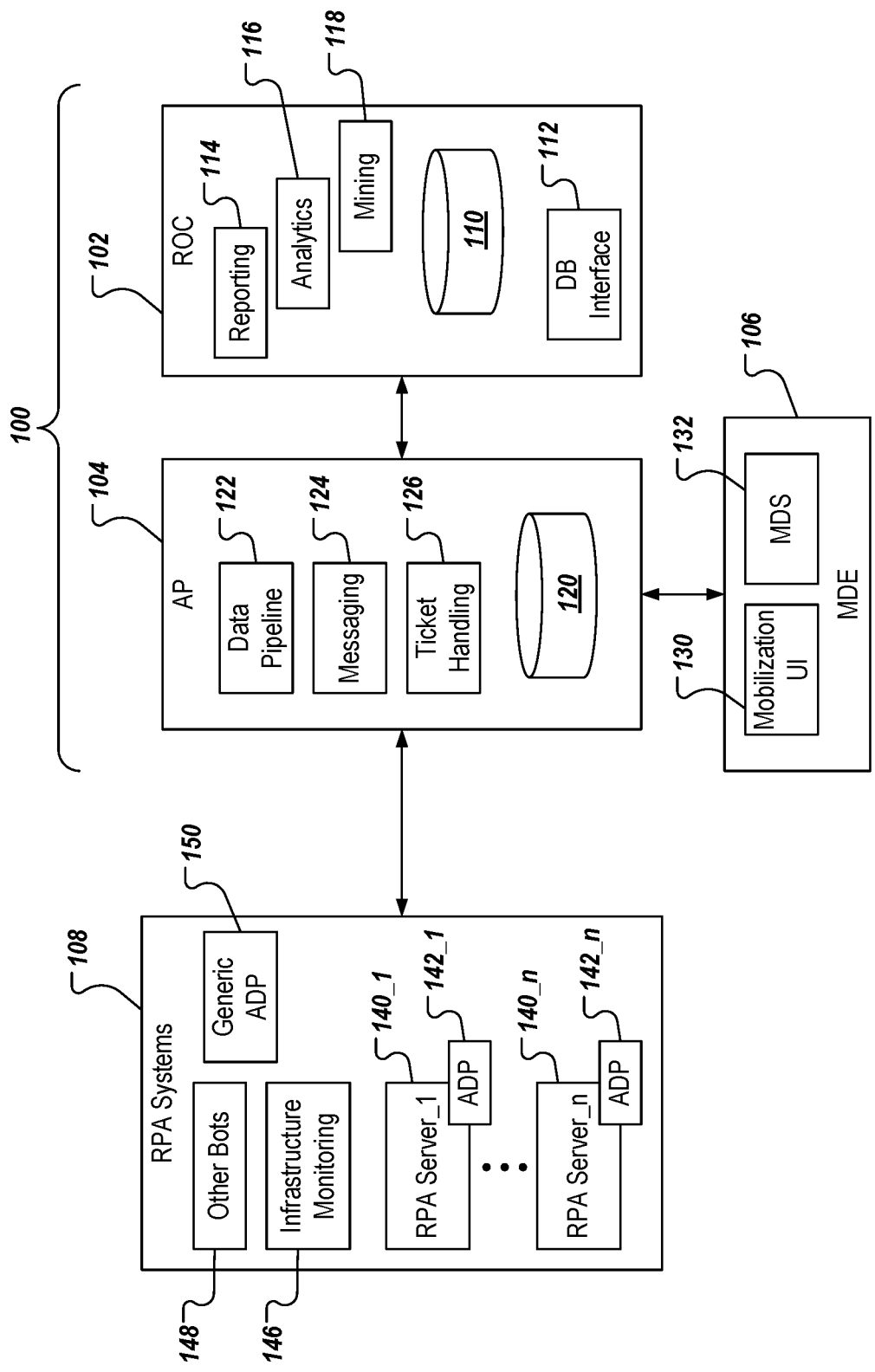
FIG. 1 depicts an example high-level architecture of an example unified automation platform (UAP) for robotic process automation (RPA).

Implementations of the present disclosure are generally directed to a unified automation platform (UAP) for robotic process automation (RPA). More particularly, implementations of the present disclosure are directed to resource-efficient record processing in UAPs for RPA. As described in further detail herein, resource-efficient processing is achieved using a combined data change tracking, and direct send approach in an adapter of the UAP. In some examples, the adapter facilitates communication between a data processing layer of an autonomic platform (AP) of the UAP, and receives transaction records from one or more RPA platforms. In some examples, the adapter tags incoming records based on record content. Any record that is tagged is sent directly to the data processing layer. Any record that is unable to be tagged is provided to a data change tracker (DCT). In some examples, the DCT compares a hash value of the record with hash values of previously received records to determine whether a change has occurred. If a change has occurred, the record is tagged, and is transmitted to the data processing layer. This reduces the burden on technical resources, such as computer memory. An example reduction in memory consumption can include approximately 96% over traditional approaches (e.g., approximately 1.8 GB down to approximately 70 MB) using implementations of the present disclosure. Further, processor consumption can be reduced (e.g., 30% down to 10%). In a UAP, this reduction in memory, and processor consumption is multiplied across multiple RPA platforms including hundreds, if not thousands of bots.

To provide further context for implementations of the present disclosure, RPA can be described as process automation technology that leverages software-implemented robots (also referred to herein as bots) to perform processes, or portions of processes. In some examples, bots include artificial intelligence (AI) features. Example AI features include, without limitation, intelligent scheduling, computer vision, language detection, entity recognition, and sentiment analysis. An RPA platform can be provided that includes multiple bots (e.g., tens, hundreds, thousands) executing on hardware systems. In some examples, a bot is deployed using a virtual machine (VM) that is executed on a hardware component (e.g., server). In some examples, multiple VMs, each running an instance of a bot, can be deployed on one or more servers.

In some examples, RPA can be implemented in organizations that have many different and complicated systems that need to interact together fluidly. For example, when an electronic form from a human resource system is lacking a form field, traditional automation software may flag the form as having an exception, and an employee would then handle the exception by, for example, looking up the missing information and entering it into the form. Once the form was completed, the employee might send it on to payroll so that the information could be entered into, for example, the organization's payroll system. With RPA, however, and continuing with the above example, a bot can be used, which is able to adapt, self-learn, and self-correct, handle exceptions, and interact with the payroll system without human assistance. Furthermore, technologies like presentation-layer automation software—a technology that mimics the steps of a rules-based, non-subjective process without compromising the existing information technology (IT) architecture—are able to consistently carry out prescribed functions, and scale-up or -down to meet demand.

RPA bots are provided in an RPA platform. Example RPA platforms include, without limitation, Automation Anywhere, Blue Prism, and UiPath. In some examples, an RPA platform provides a set of tools (e.g., bot development tools, bot management tools), libraries, and runtime environments for bots. In some examples, a bot can include one or more data objects, and logic that encodes a process (or portion of a process) that the bot is to perform. A bot interacts with one or more applications (i.e., computer-executable programs) to perform one or more jobs (e.g., processing a set of invoices). In some examples, each job includes one or more transactions (e.g., processing an invoice of the set of invoices), and each transaction can include one or more actions (e.g., entering invoice information into an application). For example, a data object of a bot can be connected to a user interface (UI) of an application (e.g., browser-based HTML interfaces, MS Windows interfaces, mainframe terminal interfaces, Java-based interfaces), and the data object executes one or more actions using the UI. For example, a data object can execute actions to log into an application, enter data, retrieve a result, and log off.

In some examples, a data object includes an application model, and one or more actions. For example, the application model is specific to an application that the bot is to interact with, and exposes elements of the UI of the application. The one or more actions include actions that the data object can perform with the application.

In some examples, an RPA platform can provide an application server that functions as a common control point for multiple bots, as well as a database. In some examples, the database functions as a shared repository for the RPA platform, storing code for each bot, work queues of the bots, audit logs, and the like. An RPA platform can also provide platform-specific control and monitoring tools for managing bots, creating dashboards, and the like.

Multiple RPA platforms can be provided across multiple enterprises. For example, a first RPA platform (e.g., Blue Prism) can be deployed for a first enterprise, and a second RPM platform (e.g., Automation Anywhere) can be deployed across a second enterprise. As noted above, however, each RPA platform includes platform-specific bots, monitoring, control, and databases. Consequently, each enterprise, and/or third-party operating on behalf of enterprises, is required to be knowledgeable about respective RPA platforms, and implement RPA platform-specific processes, and procedures to effectively, and efficiently manage and control bots on the respective RPA platforms.

In accordance with implementations of the present disclosure, a UAP is provided, which enables control, and monitoring, among other functionality, across multiple, disparate RPA platforms. In this manner, the UAP provides a central platform for management, control, analytics, and the like across multiple RPA platforms, and across multiple enterprises. For example, the UAP can be hosted, or operated by a third-party that performs RPA monitoring and control services for multiple enterprises across multiple, disparate RPA platforms. In some implementations, and as described in further detail herein, the UAP includes an RPA operations center (ROC), and an AP. In general, the UAP provides cross-platform monitoring and control at multiple levels. Example levels include a process level, a bot level, and an RPA platform level. The UAP provides, among other functionalities, reporting and analytics to measure and improve RPA services, and increase RPA levels, as well as control RPA platforms, and individual bots. Accordingly, the UAP of the present disclosure can operate across hundreds, or thousands of bots across multiple RPA platforms.

FIG. 1 depicts an example UAP 100 in accordance with implementations of the present disclosure. The example UAP 100 includes an ROC 102, and an AP 104. In the depicted example, the UAP 100 also includes a master data entry (MDE) platform 106. In accordance with implementations of the present disclosure, the UAP 100 interfaces with one or more RPA systems 108 to provide bot monitoring and control, among other functionality, across multiple, disparate RPA platforms, and multiple, disparate enterprises. In some implementations, the UAP 100 communicates with the RPA systems over one or more networks. In some examples, a network can include a large computer network, such as a local area network (LAN), a wide area network (WAN), the Internet, a cellular network, a telephone network (e.g., PSTN), or any appropriate combination thereof connecting any number of communication devices, mobile computing devices, fixed computing devices, and back-end systems.

In some implementations, and as described in further detail herein, the AP 104 provides real-time monitoring, and bot control. As used herein, real-time may describe an operation that is performed without any intentional delay, taking into account the processing, and/or communication limitations of the computing system(s) performing the operation and the time needed to initiate, and/or perform the operation. Real-time may be used to describe operations that are automatically executed in response to a triggering event, for example, without requiring human input. In some examples, the AP 104 receives data from the RPA systems 108, and processes the data to provide, among other things, alerts and events. In some implementations, and as described in further detail herein, the AP 104 includes interface components (not shown) that provide logic for real-time monitoring and control of bots of the RPA systems 108 (e.g., logic to trigger alerts to support teams).

In some implementations, the ROC 102 provides ex-post reporting, analytics, and visualizations. In some examples, the ROC 102 receives data, alerts, events, and the like from the AP 104, and provides data reporting, and analytics across the multiple RPA platforms. For example, the ROC 102 provides UIs (e.g., dashboards) that enables users to view visualizations representing performance of RPA platforms, processes, individual bots, and/or groups of bots, across one or more enterprises, for which the RPA platforms are deployed. In some implementations, the UAP 100 enables users to take remedial measures, for example, in the event that performance is degraded. For example, the user can interact with the UAP 100 to adjust bot schedules, and/or spin-up, or spin-down bots to address workload fluctuations.

In the depicted example, the ROC 102 includes a database 110, a database (DB) interface 112, a reporting module 114, an analytics module 116, and a data mining module 118. In the depicted example, the AP 104 includes a database 120, a data pipeline module 122, messaging components 124, and a ticket handling module 126. In the depicted example, the MDE 106 includes a mobilization UI 130, and one or more master data systems (MDSs) 132.

In the examples of FIG. 1, the RPA systems 108 represents multiple RPA platforms, and/or other bot frameworks that are to be monitored, and/or controlled by the UAP 100. In the depicted examples, the RPA systems 108 includes multiple RPA servers 140_1, 140_n, each RPA server corresponding to a respective RPA platform (e.g., RPA server 140_1 is a Blue Prism RPA server; RPA server 140_n is an Automation Anywhere server). Each RPA server 140_1, 140_n is associated with a respective adapter (ADP) 142_1, 142_n. The RPA systems 108 further include infrastructure monitoring components 146, one or more other bots 148, and a generic ADP 150.

In accordance with implementations of the present disclosure, the AP 104 communicates with the respective RPA servers 140_1, 140_n through the data pipeline module 122. More particularly, and as described in further detail herein, the data pipeline module 122 ingests data from the respective RPA servers 140_1, 140_n through the respective adapters 142_1, 142_n. In some implementations, each adapter 142_1, 142_n is specific to a respective RPA platform, but is provided using a design pattern, and standardized module across adapters 142_1, 142_n. The adapters 142_1, 142_n enable communication between the UAP 100, and the respective RPA platforms, manage retrieval of data (e.g., status information) from respective RPA databases, and enable discovery, and control of bots in the respective RPA platforms. Each adapter 142_1, 142_n pulls data from the respective RPA platforms 140_1, 140_n

In some implementations, the RPA systems 108 include one or more application program interfaces (APIs) that support communication with the UAP 100. In some examples, a push-listener API (not shown) is provided, and enables listening for incoming data that is pushed from one or more bots. In some examples, the push-listener API receives data from bots that are registered with the UAP 100 through the MDE 106. Although the push-listener API may receive data from non-registered bots, an error message is triggered. In effect, the push-listener API is a corollary to an adapter (e.g., the adapters 142_1, 142_n) for any automation tools, and/or bots that are not tied to a particular RPA platform (e.g., do not have a central automation application database), or where retrieval of monitoring data from such a central database is not possible. Accordingly, the monitoring data is pushed from individual automations to the push-listener API, as opposed to being pulled (as is the case with the adapters 142_1, 142_n).

In some implementations, the generic adapter 150 enables controlling (e.g., starting, stopping) of bots in RPA platforms, for which no platform-specific adapter (e.g., the adapters 142_1, 142_n) exists. In general, such bots can be controlled through a command line interface (CLI). The generic adapter 150 calls generic programs, and waits for return code. Parties providing such bots implement batch, and executable programs that are to be called by the generic adapter 150, and provide configuration files, and addresses (e.g., uniform resource locators (URLs)) to the batch, and executable programs.

In some implementations, an infrastructure API (not shown) is provided. The infrastructure API can include a web service interface for communicating infrastructure monitoring data. In some examples, the infrastructure API specifies generic data inputs, which infrastructures provide, and/or tools can provide. In some implementations, an infrastructure adapter (not shown) is provided, and can include a set of scripts (e.g., Powershell scripts) that communicate with the infrastructure API to monitor infrastructure, for which no other monitoring tool is available. In this manner, the infrastructure adapter provides a generic infrastructure monitoring solution.

In some implementations, the MDE 106 enables registration of bots that are not auto-discovered through adapters (e.g., the adapters 142_1, 142_n), or which are not registered directly to the UAP 100 (e.g., by an agent of a provider of the UAP 100). In some examples, the mobilization UI 130 is a web portal, through which a bot owner/operator can register a bot with the UAP 100. Such owner/operators can include, for example, any person or entity wanting to leverage the functionality provided by the UAP 100. In some implementations, the mobilization UI 130 validates data that is received against so-called golden source systems, and ensures completeness of master data of respective bots. In some examples, the mobilization UI 130 automates onboarding of non-discoverable bots, ensures data quality, and avoids non-matching data issues. In some examples, the MDS 132 represents any other third-party components (e.g., applications, data stores, services that are not part of the UAP 100), which are used to validate master data as part of bot onboarding to the UAP 100.

With particular reference to the AP 104, the database 120 is provided as a central database for storing data records received from the RPA systems 108. In some examples, the database 120 is provided as an online transaction processing (OLTP) database provided on a SQL server. In some implementations, the data pipeline 122 can include a central messaging system that is used to communicate data between components of the UAP 100. In some examples, the data pipeline 122 can be provided as a messaging system for communicating voluminous data. In some examples, the data pipeline 122 is provided using Kafka, which is provided by the Apache Software Foundation. Kafka can be described as a distributed streaming platform that enables messaging (e.g., queuing, publish-subscribe) for streaming data records, as well as real-time processing of the data records. In some examples, the data pipeline 122 is provided as a cluster (Kafka cluster) on one or more servers, and stores streams of data records, each data record. A data record can include a key, a value, and a timestamp. In some examples, the data pipeline 122 receives data records from producers. Example producers can include RPA platforms, and bots. In short, the producers produce data records, which are received by the data pipeline 122.

In some implementations, the messaging components 124 represent one or more channels, through which messages can be provided (e.g., to users, to computing systems). Example channels include, without limitation, electronic messages (e-mail), instant messages, text messages, and SMS messages. For example, logic executed by the AP 104 can trigger an alert (e.g., bot failure), and a message can be sent over one or more of the messaging components 124 in response thereto (e.g., to a user responsible for monitoring bot activity).

In some implementations, the ticket handling module 126 provides a ticket generation and management system that is used to track resolution of incidents. In some examples, the ticket handling module 126 is provided by a third-party service provider, and is external to the UAP 100. An example ticketing system can be provided by Service Now. In such examples, the AP 104 communicates with the external ticketing system through a respective API.

With regard to the ROC 102, data is ingested into the database 110 through the database interface 112. In some implementations, the database 110 is provided as an online analytical processing (OLAP) database. In general, the database 110 functions as a central database for analytics, reporting, and visualizations. In some examples, the database interface 112 is provided as a database link with OLTP, and/or extraction, transforming, and loading (ETL) (e.g., using SQL Server Integration Services (SSIS)). In some examples, the database interface 112 receives data from the database 120 of the AP 104, transforms data (e.g., from an OLTP data schema to an OLAP data schema), and performs data aggregation (e.g., for reporting). In some examples, the database interface 112 receives data from one or more other systems, such as the ticket generation and management system introduced above.

In some implementations, the reporting module 114 queries data from the database 110, and provides reports (e.g., textual, graphical). In some examples, the reporting module 114 provides reports through one or more dashboards, and/or transmits reports to external computing devices (e.g., emails reports to users). In some implementations, the ROC 102 includes a reporting API (not shown). In some examples, the reporting API exposes a web service that enables data sets to be accessed (e.g., for consumption by client reporting systems, data mining systems, AI systems, bespoke reporting systems, analytics systems).

In some implementations, the analytics module 116 provides reporting and dashboard visualizations for RPA support teams (e.g., agents of the UAP responsible for supporting RPA execution). In some examples, the analytics module provides access to standardized reports and dashboards that provide actionable information to improve RPA execution, and provide service status, and bot health information. In some implementations, the data mining module 118 provides more advanced dashboards and data visualizations, and can leverage third-party services. An example third-party service can include Tableau provided by Tableau Software. In some examples, the ROC 102 includes one or more other data mining technologies.

As introduced above, implementations of the present disclosure are directed to resource-efficient record processing in UAPs for RPA. In particular, implementations of the present disclosure provide resource-efficient record processing of data records ingested by an AP (e.g., the AP 104 of FIG. 1) from RPA systems (e.g., RPA systems 108 of FIG. 1).

Figure 2:
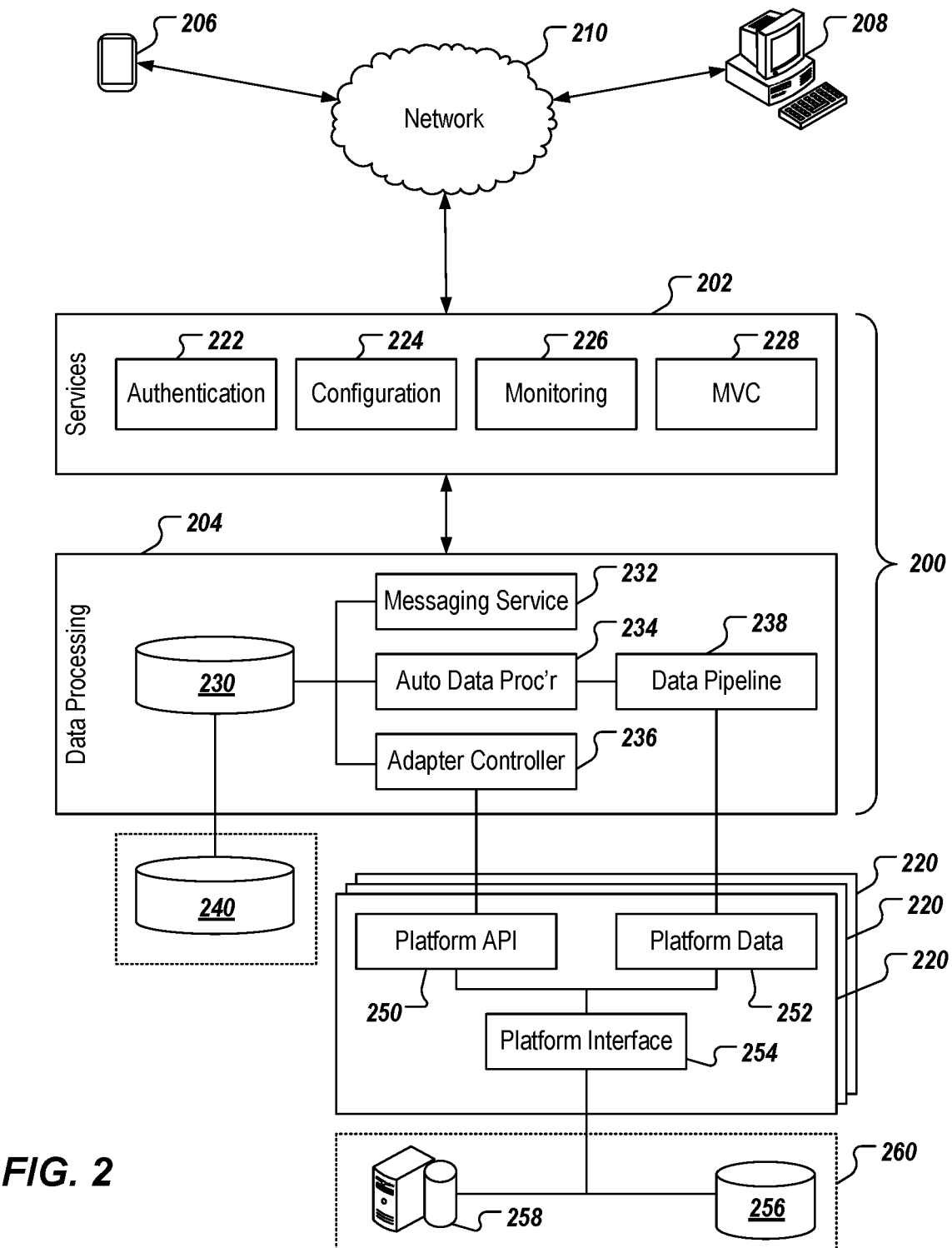
FIG. 2 depicts an example high-level architecture of an example autonomic platform (AP) of the UAP of FIG. 1.

FIG. 2 depicts an example high-level architecture of an example AP 200 of a UAP. For example, the AP 200 of FIG. 2 can be an example implementation of the AP 104 of the UAP 100 of FIG. 1. In the depicted example, the AP 200 includes a services layer 202, and a data processing layer 204. In some examples, one or more computing devices 206, 208 can communicate with the AP 200 over a network 210. One or more platform adapters 220 are provided, through which the AP 200 communicates with respective RPA platforms (e.g., Blue Prism, Automation Anywhere, UiPath). In some examples, each adapter 220 is authenticated to its respective RPA platform. For example, an adapter 220 includes an authentication token, which is generated during an installation and authentication process of the adapter 220 on the respective RPA platform.

In general, the AP 200 provides detailed status information regarding each process, and/or resource of respective RPA platforms. Example status information includes, without limitation: how many resources are running a process and will be required to complete the assigned tasks (e.g., within a SLA target); how many cases are pending to start, loaded new, and carried over from a previous time period (e.g., day); and expected completion time, average case time, and oldest case date. In some examples, a case is a segment of work to be completed by a process. For example, a case can include processing a series of invoices for payment, a task within the case can include processing a single invoice. The AP 200 also enables control of resources, for example: start and stop resources; restart the automation service the resource is running on, reboot the resource; a fail-safe prompt to reduce the chance of human error; live information about the resource (e.g., status, last case time, and log history); list available resources against all or selected processes with group selection; and providing a calendar for viewing history of processing tasks and logs.

In further detail, the services layer 202 includes a plurality of services, through which users can interact with the AP 200. In some examples, each service is provided as a web service. Example services include, without limitation, an authentication service 222, a configuration service 224, a monitoring service 226, and a control service 228.

In some examples, the authentication service 222 authenticates users for access to the AP 200. In some examples, authentication is at least partially conducted through the network 210 (e.g., the computing device 206, 208 connecting through a virtual private network (VPN)). In some examples, users are explicitly added to the AP through a control panel of the authentication service 222. All user sessions and operations are logged in a database of the AP 200, described herein. In one example, the authentication service 222 expects valid credentials (e.g., username, password), and returns an access token that is used in subsequent calls (e.g., when authenticating with a REST API, the AP 200 uses a standard OAuth2 Bearer workflow). In some examples, the authentication service 222 is also responsible for answering queries about user permissions to system resources, as well as allowing administrators to modify the access levels of other users.

In some examples, the configuration service 224 enables configuration of the AP 200. Example configurations can include, without limitation, creating/managing user profiles, setting up communication with RPA platforms, defining polling rates (e.g., frequency of polling RPA platforms for data), and the like. In some examples, the monitoring service 226 enables configuration of monitoring activities, and visualizations to be displayed. For example, the monitoring service 226 can be used to identify processes, bots, groups of bots, and/or RPA platforms that are to be monitored, as well as types of visualizations to be displayed for each. In some examples, the configuration service 224 enables querying, adding, and/or modifying domain-specific configurations in the AP 200. Example domain-specific configurations include, without limitation, client information, process information, and resource assignments.

In some implementations, the control service 228 accepts command requests for processes and resources, and stores the requests for background execution. In some examples, the control service 228 is provided as a model-view-controller (MVC) service.

In the depicted example, the data processing layer 204 includes a database 230, a messaging service 232, an automation data processor 234, an adapter controller 236, and a data pipeline 238. In some examples, the database 230, the messaging service 232, and the data pipeline 238 respectively correspond to the database 120, the messaging components 124, and the data pipeline 122 of FIG. 1. In some examples, the automation data processor 234 processes data about the state of the RPA platforms 260, and ensures that the database 230 reflects information correctly. The automation data processor 234 also calculates red-amber-green (RAG) statuses of the processes and resources that are monitored.

In some implementations, multiple automation data processors 234 are provided, and process data records having respective record types. Example record types are described in further detail herein. For example, a first automation data processor 234 is provided, which processes data records of a first type, and a second automation data processor is provided, which processes data records of a second type. In some examples, and as also described in further detail herein, the data pipeline 238 receives messages with data records from the adapters 220. The data pipeline 238 places the messages in respective processor queues. For example, messages having data records of the first type are placed in a first processor queue, and messages having data records of the second type are placed in a second processor queue. The automation data processor 234 retrieves messages from its respective queues, and processes the data records as described herein (e.g., determining RAG status, inserting into the database 230).

In some implementations, the data processing layer 204 periodically receives data from each RPA platform through respective adapters 220. In some implementations, each adapter 220 is specific to a respective RPA platform, and is installed on an RPA server of the RPA platform. For example, the adapters 220 of FIG. 2 correspond to the adapters 142_1, 142_n of FIG. 1. In some examples, the adapter 220 harmonizes data by transforming data of the respective RPA platform into a data schema used by the AP 200, and providing the data to the AP 200 (e.g., to the data pipeline 238). In some examples, each adapter 220 includes multiple modular libraries, and code packages. One or more libraries are specific to the respective RPA platform that the adapter 220 is installed on. One or more libraries are common to all of the adapters 220, regardless of which RPA platform.

In the depicted example, an adapter 220 includes a platform API 250, a platform data module 252, and a platform interface 254. In some examples, the platform interface 254 communicates with hardware 258 (e.g., servers, on which bots run), and/or a database 256 (e.g., storing log tables) of the respective RPA platform 260. For example, the platform interface 254 requests, and receives data from the database 256, which data is provided to the data pipeline 238 through the platform data module 252. In some implementations, the adapter controller 236 provides control signals for controlling a process, and/or bot through the platform API 250. For example, a process, and/or bot can be started, or stopped. In some examples, the adapter controller 236 can be used to configure, among other things, credentials for accessing the respective RPA platform 260, setting exception parameters (e.g., to trigger an exception), and the like.

In some implementations, the platform data module 252 relays data records (e.g., containing automation information) from the RPA platform 260 to the AP 200. Token and SSL authentication is in place to ensure the data is securely sent. In some examples, the platform data module 252 includes an automatic discovery that synchronizes new processes, and/or resources to ensure the AP 200 reflects the current state of the RAP platform 260. In some examples, automation synchronization transfers process run, resource run, and truncation status information. In some examples, the platform data module 252 publishes messages from a messaging queue to an AutomationData topic hosted on the data pipeline 238. In some implementations, the platform API 250 receives authenticated calls (e.g., REST calls) from the AP 200 to trigger resource action, and/or process action, and/or remote updates of configuration.

As introduced above, the data pipeline 238 can be provided as a Kafka cluster. In some examples, there are three main types of objects in the data pipeline 238: topics (queues of messages), producers (actors that add messages to a topic), and consumers (actors that take messages out of a topic). In the present context, the automation data processor 234 is a consumer, and the platform data module 252 is a producer. In some examples, the data pipeline 238 ensures that consumers of a topic receive its messages in the order they were added. In the present context, the platform data module 252 produces messages for the AutomationData topic. In some examples, the data in the messages includes, without limitation: newly discovered processes, and/or resources in the RPA platform 260; newly created instances of a process, and/or a resource are created; and transaction status, and log data for running processes, and/or running resources.

In some implementations, parameters can be defined to determine whether a respective process, bot, and/or RPA platform is operating as expected (e.g., meeting service level agreements (SLAs)), and/or whether there are any problems (e.g., process unexpectedly stopped, bot performance is degraded, hardware performance is degraded). In some examples, if operation is not executing as expected, and/or there is a problem, an exception is triggered. Example exceptions can include a process, a bot, and/or a RPA platform not meeting a required SLA (e.g., a business exception), and performance degradation of a process, a bot, and/or a RPA platform (e.g., a technical exception). In response to an exception, reports, and/or alerts can be provided.

In general, the AP 200 ingests data from one or more RPA platforms through the data pipeline 238, processes the data using the automation data processor 234, and stores the data in the database 230. In the depicted example, a back-up database 240 is provided, which can store redundant copies of the data, and any reports or the like that the AP 200 provides. In some examples, the messaging service 232 transmits notifications (e.g., alerts), for example, in response to conditions (e.g., an e-mail to a user responsible for monitoring the particular RPA platform). In some examples, the reports, and/or alerts are graphically represented using one or more visualizations (e.g., provided through the monitoring service 226). Example notifications can include, without limitation: process X has completed; resource X has completed; process X has a high application exception rate; process X has a high business exception rate; resource X has stopped responding; and resource X has not responded in X minutes.

In some implementations, the data is provided in various data types. Example data types include, without limitation, process run, resource run, transaction, log. In some examples, process data is representative of a particular process executed by a bot (e.g., a process that queues tasks to be performed). In some implementations, data is provided to the AP 200 in one or more data records. For example, a data record having a process type can include the example tuple, process identifier, process information (e.g., status, bot identifier), timestamp, process run type. In some examples, resource data is representative of a bot performing tasks. For example, a data record having a resource type can include the example tuple: resource identifier, resource information (e.g., status, process identifier), timestamp, resource run type. In some examples, transaction data is representative of actions (e.g., a task changing from a pending status to a running status on a particular bot). For example, a data record having a transaction type can include the example tuple: transaction identifier, transaction status (e.g., pending, running, process identifier, bot identifier), timestamp, transaction type. In some examples, log data is representative of data added to one or more logs (e.g., an exceptions log). For example, a data record having a log type can include the example tuple: log identifier, log data (e.g., application/bot/process failed), timestamp, log type.

In some implementations, each data record is tagged. Example tags can include, without limitation, create, update, and delete. A create tag can indicate that a log entry is to be created, that a process has started, or that a resource has started. An update tag can indicate that data associated with a process or a resource has changed. A delete tag can indicate that a process or a resource has finished.

As introduced above, implementations of the present disclosure reduce the number of data records that are to be processed through a DCT. Further, the DCT processes untagged data records by, for each data record, comparing a hash value of the record with hash values of previously received records to determine whether a change has occurred. If a change has occurred, the data record is tagged, and is transmitted to the data processing layer. This reduces the burden on technical resources, such as computer memory.

Figure 3A:
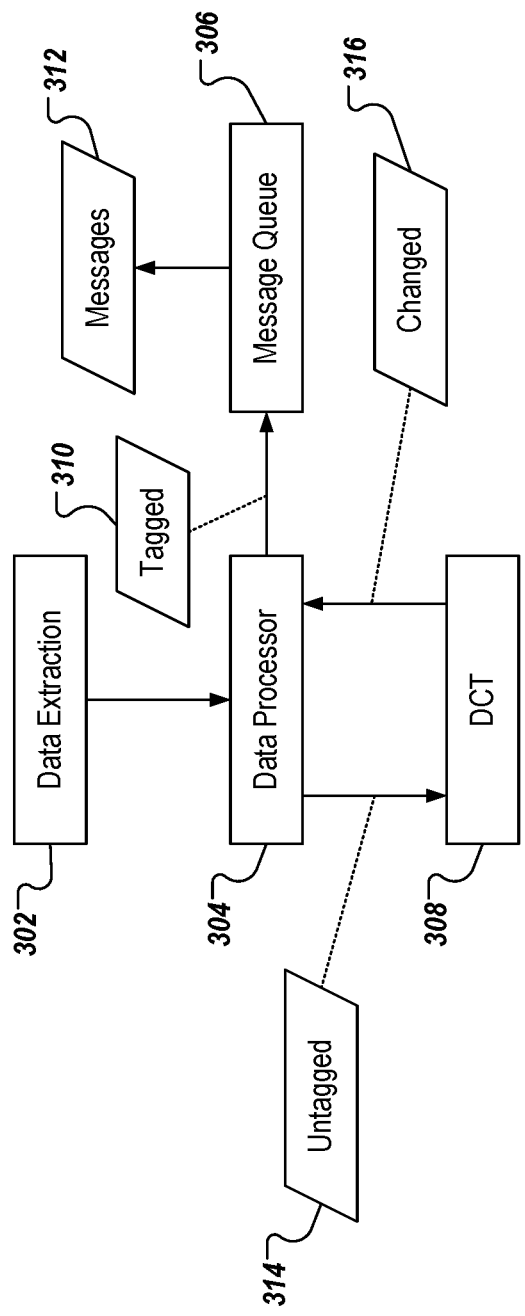
FIG. 3A depicts a schematic diagram illustrating implementations of the present disclosure.

FIG. 3A depicts a schematic diagram illustrating implementations of the present disclosure. In the example of FIG. 3A, a data extraction module 302, a data processor module 304, a message queue 306, and a DCT 308 are provided. In some examples, the data extraction module 302 receives data records from a respective RPA platform (e.g., the RPA platform 260 of FIG. 2). Example data records include log information recorded by the RPA platform. The log information can be recorded in a significant number of log entries (e.g., hundreds, thousands, millions). For example, the multiplicity of processes (e.g., one or more automated actions and activities performed to complete a task), and/or resources (e.g., VMs, processors used to perform work) provided by the RPA platform results in the relatively high number of data records.

In some implementations, the data extraction module 302, the data processor module 304, the message queue 306, and the DCT 308 are provided within an adapter (e.g., the adapter 220 of FIG. 2). For example, and with reference to the adapter of FIG. 2, the platform interface 254 provides the data extraction module 302, and the platform data module 252 provides the data processor module 304, the message queue 306, and the DCT 308.

In accordance with implementations of the present disclosure, the data extraction module 302 receives data records from the RPA platform, and queues the data records for processing in an extraction queue. In some implementations, each data record has a corresponding record type. The record types can be provided in groups. Example groups include discovery, and automation. Discovery record types relate to data generated in an adaptor discovering new processes, and/or resources of the respective RPA platform. Example discovery record types can include, without limitation, queue, process, and resource. Automation records types relate to data generated in automation activities for executing processes, and resources. Example automation record types can include, without limitation, process run, resource run, transaction, and log.

The data extraction module 302 processes data records from the extraction queue, and attempts to tag each data record received from the RPA platform. In some implementations, a set of data records is received by the data extraction module 302, and the data extraction module 302 outputs a first sub-set of data records, and a second sub-set of data-records. In some examples, the first sub-set of data records includes tagged data records (i.e., data records of the set of data records, for which the data extraction module 302 provided tags). In some examples, the second sub-set of data records include data records, for which no tags are provided (i.e., data records of the set of data records, for which the data extraction module 302 could not provide tags). Each data record can include, without limitation, an identifier that uniquely identifies the data record (e.g., a universally unique identifier (UUI)), data (e.g., type of log (warning, debug), log content, resource start/end time, process start/end time), and a record type. Accordingly, the data records tagged by the data extraction module 302 need not be processed by the DCT 308. In this manner, computing resources and memory that would be otherwise consumed by the DCT 308 are conserved.

In some implementations, the first sub-set of data records, and the second sub-set of data records are received by the data processor module 304. In some examples, the data processor module 304 provides the first sub-set of data records as messages 310 that are provided to the message queue 306. Among other data of the tagged data records, the messages 310 include the respective tag data. In some examples, the data processor module 304 transforms the tagged data records into respective messages using a mapping that maps the tags (e.g., create, update, delete) to a respective message type. In this manner, the data processor module 304 transforms the data records from a data schema of the RPA platform to a data schema of the AP (e.g., the AP 200 of FIG. 2) that receives the messages.

In some implementations, the data processor module 304 provides the second sub-set of data records to the DCT 308. In some implementations, for each untagged data record, a respective hashed record is provided. In some examples, the hashed record is provided as a tuple including the identifier (e.g., the identifier of the data record), a hash value, and the record type. In some examples, the hash value is provided as a hash of content of the data record. The hash value can be provided using a known hash function (e.g., SHA-256). In some examples, the hashed records are provided to the DCT 308.

In some implementations, for each untagged data record, the DCT 308 compares a respective hashed record to stored hashed records to determine whether there is a match. In some examples, the stored hashed records correspond to data records received in a previous cycle (e.g., an immediately preceding cycle), and processed by the DCT 308. A cycle can include a cycle of extracting data records from the RPA platform (e.g., periodic data extraction). In some examples, each hashed record includes an identifier (i.e., the unique identifier assigned to the data record), the hash value, and the record type.

In some examples, the identifier (e.g., resource identifier, process identifier, transaction identifier) of a hashed record is compared to identifiers in the stored hashed records. If there is a match (i.e., the identifier is included in the stored hashed records), the hash value is compared to the stored hash value. If the hash values are different, then a change has occurred since the last cycle (e.g., the content of the data record has changed). If a change has occurred, the previously untagged data record corresponding to the identifier is noted with a change (e.g., update), and is added to a set of data records to be output by the DCT 308. If the hash values are the same, no change has occurred since the last cycle. If no change has occurred, the data record corresponding to the identifier is not added to the set of data records output by the DCT 308. In some examples, if the identifier of the hashed record is not in the stored hashed records, the data record corresponding to the identifier is new. Consequently, the data record is noted with a change (e.g., create), and is added to the set of data records to be output by the DCT 308. In some examples, if an identifier of a stored hashed record is not included in the second sub-set of data records input to the DCT 308, it is determined that the data record corresponding to the identifier has been deleted since the last cycle. Consequently, the data record is tagged (e.g., with a delete tag), and is added to the set of data records to be output by the DCT 308.

The DCT 308 provides a set of data records that have been tagged based on the identifier, and hash value comparisons. In some examples, the set of data records output by the DCT 308 includes fewer data records than the second sub-set of data records, which was input to the DCT 308. For example, and as discussed above, data records having unchanged hash values are not included in the set of data records output by the DCT 308. The data processor 304 receives the set of data records from the DCT 308, and provides corresponding messages for the message queue 306.

FIG. 3B depicts example sets of data records to illustrate implementations of the present disclosure. A set of data records 350 includes data records received from the respective RPA platform. In some examples, the set of data records 350 includes data records from the extraction queue. Each data record includes a respective identifier (ID), information (INFO), timestamp (T), and record type (TYPE) (e.g., process run, resource run, transaction, log). Although the set of data records 350 includes seven (7) data records, it is contemplated that hundreds, thousands, or millions of data records can be included.

The set of data records 350 is processed to tag one or more records. For example, and as described above, the data extraction module 302 processes the set of data records to provide a set of data records 352. In the depicted example, the set of data records 352 includes tagged data records (e.g., $ID_1$, $ID_4$, $ID_6$), and untagged data records (e.g., $ID_2$, $ID_3$, $ID_5$, $ID_7$). For example, and as described above, the data extraction module 302 can tag at least some of the data records to provide a first sub-set of data records (e.g., $ID_1$, $ID_4$, $ID_6$), and a second sub-set of data records (e.g., $ID_2$, $ID_3$, $ID_5$, $ID_7$).

A set of hashed records 354 is provided. For example, the untagged data records of the set of data records 352 are processed to provide the set of hashed records 354. In some examples, at least a portion of an untagged data records is processed through a hash function to provide a respective hash value (HASH). In some examples, the set of hashed records 354 is provided by the data processor module 304, and is provided to the DCT 308.

A set of previous hashed records 356 is provided. In some examples, the set of previous hashed records 356 includes hashed data records that had been evaluated by the DCT 308 in a previous iteration. In some examples, hashed records in the set of hashed records 354 are compared to hashed records in the set of previous hashed records 356 to provide an output set 358. In the example of FIG. 3B, hash values of $ID_3$ and $ID_7$ are the same between the set of hashed records 354, and the set of previous hashed records 356. Consequently, it is determined that those data records did not change between iterations, and they are not included in the output set of hashed records 358. The hash value of $ID_2$ is different between the set of hashed records 354, and the set of previous hashed records 356. Consequently, it is determined that that respective process, resource, or transaction changed between iterations, and the identifier is included in the output set 358 with a corresponding change indicator (e.g., update (U)).

The data record of $ID_5$ in the set of hashed records 354 is not included in the set of previous hashed records 356. Consequently, it is determined that that respective process, resource, or transaction is new, and the identifier is included in the output set 358 with a corresponding change indicator (e.g., create (C)). The data record of $ID_8$ in the set of previous hashed records 356 is not included in the set of hashed records 354. Consequently, it is determined that that respective process, resource, or transaction has stopped, and the identifier is included in the output set 358 with a corresponding change indicator (e.g., delete (D)). In some examples, the output set 358 is provided to the data processor module 304, which adds respective tags to previously untagged data records in the set of data records 352 based on the respective change indicators from the output set of 358.

As introduced above, the adapter 220 transmits data records to the AP 200 through a messaging service (e.g., data records are transferred as messages). Messages are queued in a message queue within the platform data module 252. In accordance with implementations of the present disclosure, messages (e.g., data records) that are transferred from the message queue are not immediately deleted from the message queue. Instead, in some implementations, sent messages are only deleted after confirmation of receipt has been received from the data processing layer 204 of the AP 200. In this manner, there exist concurrent queues to provide data redundancy for at least a period of time (e.g., until the data records have been processed by the data pipeline 238. Within the data processing layer 204, the data records are transferred from the data pipeline 238, and the automated data processor 234.

In further detail, the message queue of the platform data module 252 uses a pointer to keep track of sent messages. For example, if the message queue includes fifty (50) messages, the pointer is initially set at the first message. If the first ten (10) messages are sent, the pointer moves to the eleventh message. However, the first ten (10) messages remain in the message queue. After the data pipeline 238 successfully receives the first ten (10) messages, the data pipeline 238 transmits a confirmation for each message. In response to receiving the confirmation, the platform data module 252 deletes the first (10) messages. Consequently, the eleventh message becomes the first message, to which the pointer point.

Figure 4:
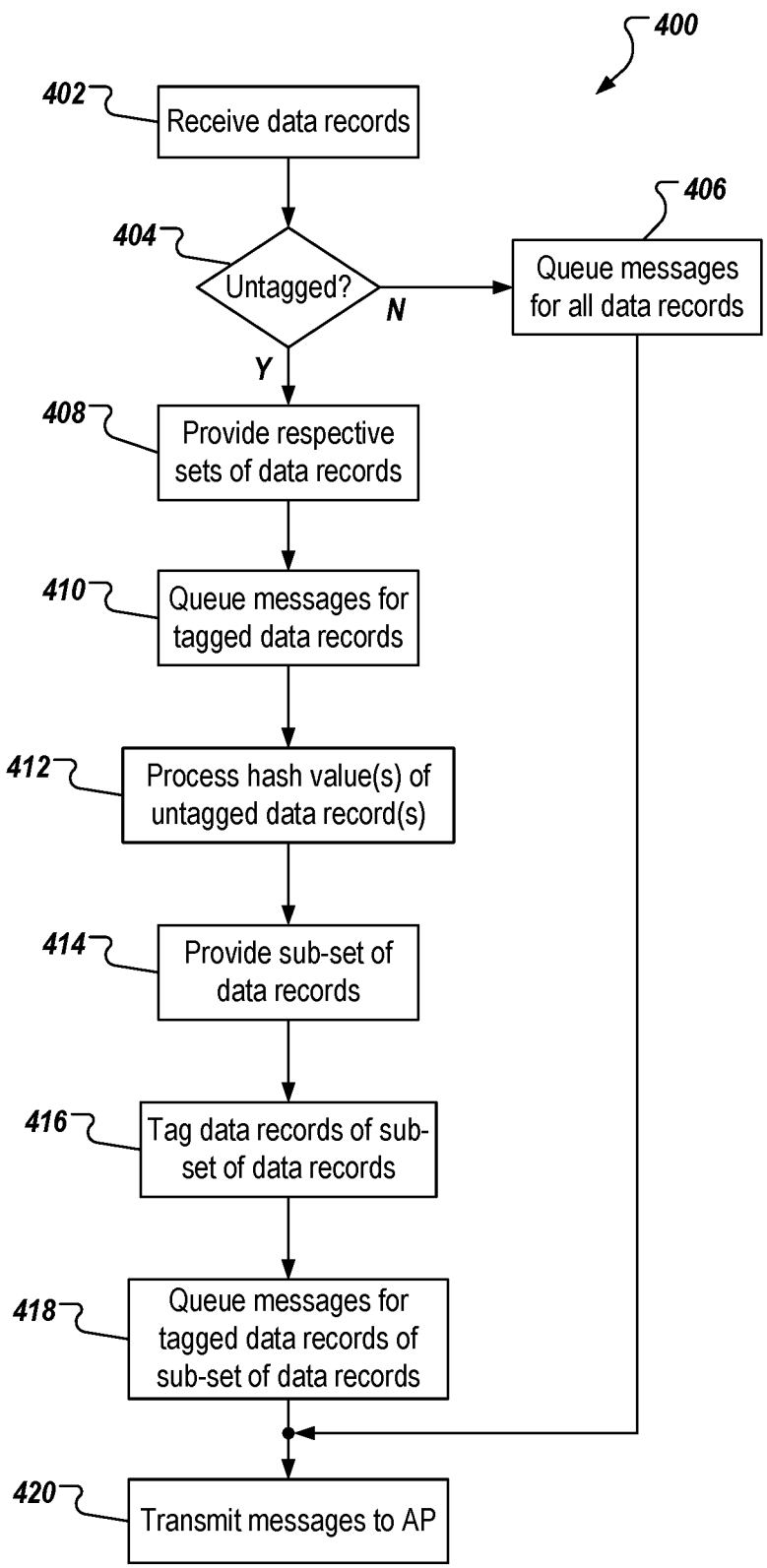
FIG. 4 depicts an example process in accordance with implementations of the present disclosure.

FIG. 4 depicts an example process 400 that can be executed in implementations of the present disclosure. In some examples, the example process 400 is provided using one or more computer-executable programs executed by one or more computing devices.

Data records are received (402). For example, a platform-specific adapter of an AP receives a set of data records from a RPA platform of a plurality of RPA platforms the AP interacts with. In some examples, the platform-specific adaptor is specific to the RPA platform, and the AP communicates with multiple RPA platforms. It is determined whether the data records include any untagged data records (404). For example, the platform-specific adapter (e.g., a data processor of the platform-specific adapter) can determine whether any data records are absent a tag. If there are no untagged data records, messages for all data records in the set of data records are queued (406), and are transmitted to the AP (420).

If there are untagged data records, respective sets of data records are provided for untagged data records, and tagged data records (408). For example, the platform-specific adapter provides a first set of data records including tagged data records, and a second set of data records including untagged data records. Messages are queued for any tagged data records (410). That is, messages are queued for data records in the first set of data records. Hash values of untagged data records are processed (412). That is, for example, for each data record in the second set of data records, a data change tuple including an identifier, and a hash value is provided. A sub-set of data records is provided (414). For example, a sub-set of data records is provided from the second set of data records based on comparing one or more hash values of data change tuples to a set of stored hash values. In some examples, the sub-set of data records includes fewer data records than the second set of data records, and each data record in the sub-set of data records includes a change indicator.

Data records of the sub-set of data records are tagged (416). For example, the platform-specific adapter determines a tag for each data record in the sub-set of data records based on a respective change indicator. Messages for tagged data records of the sub-set of data records are queued (418). A set of messages is transmitted to the AP (420). In some examples, the set of messages communicates tagged data records of the first set of data records, and the sub-set of data records.

Implementations and all of the functional operations described in this specification may be realized in digital electronic circuitry, or in computer software, firmware, or hardware, including the structures disclosed in this specification and their structural equivalents, or in combinations of one or more of them. Implementations may be realized as one or more computer program products, i.e., one or more modules of computer program instructions encoded on a computer readable medium for execution by, or to control the operation of, data processing apparatus. The computer readable medium may be a machine-readable storage device, a machine-readable storage substrate, a memory device, a composition of matter effecting a machine-readable propagated signal, or a combination of one or more of them. The term "computing system" encompasses all apparatus, devices, and machines for processing data, including by way of example a programmable processor, a computer, or multiple processors or computers. The apparatus may include, in addition to hardware, code that creates an execution environment for the computer program in question (e.g., code that constitutes processor firmware, a protocol stack, a database management system, an operating system, or any appropriate combination of one or more thereof). A propagated signal is an artificially generated signal (e.g., a machine-generated electrical, optical, or electromagnetic signal) that is generated to encode information for transmission to suitable receiver apparatus.

A computer program (also known as a program, software, software application, script, or code) may be written in any appropriate form of programming language, including compiled or interpreted languages, and it may be deployed in any appropriate form, including as a stand alone program or as a module, component, subroutine, or other unit suitable for use in a computing environment. A computer program does not necessarily correspond to a file in a file system. A program may be stored in a portion of a file that holds other programs or data (e.g., one or more scripts stored in a markup language document), in a single file dedicated to the program in question, or in multiple coordinated files (e.g., files that store one or more modules, sub programs, or portions of code). A computer program may be deployed to be executed on one computer or on multiple computers that are located at one site or distributed across multiple sites and interconnected by a communication network.

The processes and logic flows described in this specification may be performed by one or more programmable processors executing one or more computer programs to perform functions by operating on input data and generating output. The processes and logic flows may also be performed by, and apparatus may also be implemented as, special purpose logic circuitry (e.g., an FPGA (field programmable gate array) or an ASIC (application specific integrated circuit)).

Processors suitable for the execution of a computer program include, by way of example, both general and special purpose microprocessors, and any one or more processors of any appropriate kind of digital computer. Generally, a processor will receive instructions and data from a read only memory or a random access memory or both. Elements of a computer can include a processor for performing instructions and one or more memory devices for storing instructions and data. Generally, a computer will also include, or be operatively coupled to receive data from or transfer data to, or both, one or more mass storage devices for storing data (e.g., magnetic, magneto optical disks, or optical disks). However, a computer need not have such devices. Moreover, a computer may be embedded in another device (e.g., a mobile telephone, a personal digital assistant (PDA), a mobile audio player, a Global Positioning System (GPS) receiver). Computer readable media suitable for storing computer program instructions and data include all forms of non-volatile memory, media and memory devices, including by way of example semiconductor memory devices (e.g., EPROM, EEPROM, and flash memory devices); magnetic disks (e.g., internal hard disks or removable disks); magneto optical disks; and CD ROM and DVD-ROM disks. The processor and the memory may be supplemented by, or incorporated in, special purpose logic circuitry.

To provide for interaction with a user, implementations may be realized on a computer having a display device (e.g., a CRT (cathode ray tube), LCD (liquid crystal display) monitor) for displaying information to the user and a keyboard and a pointing device (e.g., a mouse, a trackball, a touch-pad), by which the user may provide input to the computer. Other kinds of devices may be used to provide for interaction with a user as well; for example, feedback provided to the user may be any appropriate form of sensory feedback (e.g., visual feedback, auditory feedback, tactile feedback); and input from the user may be received in any appropriate form, including acoustic, speech, or tactile input.

Implementations may be realized in a computing system that includes a back end component (e.g., as a data server), a middleware component (e.g., an application server), and/or a front end component (e.g., a client computer having a graphical user interface or a Web browser, through which a user may interact with an implementation), or any appropriate combination of one or more such back end, middleware, or front end components. The components of the system may be interconnected by any appropriate form or medium of digital data communication (e.g., a communication network). Examples of communication networks include a local area network ("LAN") and a wide area network ("WAN"), e.g., the Internet.

The computing system may include clients and servers. A client and server are generally remote from each other and typically interact through a communication network. The relationship of client and server arises by virtue of computer programs running on the respective computers and having a client-server relationship to each other.

While this specification contains many specifics, these should not be construed as limitations on the scope of the disclosure or of what may be claimed, but rather as descriptions of features specific to particular implementations. Certain features that are described in this specification in the context of separate implementations may also be implemented in combination in a single implementation. Conversely, various features that are described in the context of a single implementation may also be implemented in multiple implementations separately or in any suitable subcombination. Moreover, although features may be described above as acting in certain combinations and even initially claimed as such, one or more features from a claimed combination may in some cases be excised from the combination, and the claimed combination may be directed to a sub-combination or variation of a sub-combination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the implementations described above should not be understood as requiring such separation in all implementations, and it should be understood that the described program components and systems may generally be integrated together in a single software product or packaged into multiple software products.

A number of implementations have been described. Nevertheless, it will be understood that various modifications may be made without departing from the spirit and scope of the disclosure. For example, various forms of the flows shown above may be used, with steps re-ordered, added, or removed. Accordingly, other implementations are within the scope of the following claims.

What is claimed is:

1. A computer-implemented method for reducing data flow between of an autonomic platform (AP), and one or more robotic process automation (RPA) platforms, the method comprising:
   receiving, by a platform-specific adapter of the AP, a set of data records from a RPA platform of a plurality of RPA platforms the AP interacts with;
   providing, by the platform-specific adapter, and from the set of data records, a first set of data records comprising tagged data records, and a second set of data records comprising untagged data records;
   for each data record in the second set of data records, providing a data change tuple comprising an identifier, and a hash value;
   providing a sub-set of data records from the second set of data records based on comparing one or more hash values of data change tuples to a set of stored hash values, the sub-set of data records comprising fewer data records than the second set of data records, and each data record in the sub-set of data records comprising a change indicator;
   determining, by the platform-specific adapter, a tag for each data record in the sub-set of data records based on a respective change indicator, each tag comprising one of a create tag, an update tag, and a delete tag, the create tag indicating one of that a log entry is to be created, that a process within the RPA platform has started, and that a resource within the RPA platform has started, the update tag indicating that data associated with one of a process and a resource within the RPA platform has changed, and the delete tag can indicating that one of a process and a resource within the RPA platform has finished; and
   transmitting, by the platform-specific adapter, a set of messages to the AP, the set of messages communicating tagged data records of the first set of data records, and the sub-set of data records.

2. The method of claim 1, wherein if a hash value of a data record does not match a hash value of a corresponding stored hashed record, the data record is tagged, and is included in the sub-set of data records.

3. The method of claim 1, wherein comparing hash values of data change tuples to a set of stored hash values comprises, for at least one data record, determining that the identifier of the at least one data record is included in the set of stored hash values.

4. The method of claim 1, wherein the set of data records is received during a cycle, and the set of stored hash values correspond to data records received in an immediately preceding cycle.

5. The method of claim 1, wherein hash values are provided using a hash function.

6. The method of claim 1, wherein the platform-specific adaptor is specific to the RPA platform, and the AP communicates with multiple RPA platforms.

7. The method of claim 1, wherein a unified automation platform (UAP) comprises the AP.

8. One or more non-transitory computer-readable storage media coupled to one or more processors and having instructions stored thereon which, when executed by the one or more processors, cause the one or more processors to perform operations for reducing data flow between of an autonomic platform (AP), and one or more robotic process automation (RPA) platforms, the operations comprising:

receiving, by a platform-specific adapter of the AP, a set of data records from a RPA platform of a plurality of RPA platforms the AP interacts with;

providing, by the platform-specific adapter, and from the set of data records, a first set of data records comprising tagged data records, and a second set of data records comprising untagged data records;

for each data record in the second set of data records, providing a data change tuple comprising an identifier, and a hash value;

providing a sub-set of data records from the second set of data records based on comparing one or more hash values of data change tuples to a set of stored hash values, the sub-set of data records comprising fewer data records than the second set of data records, and each data record in the sub-set of data records comprising a change indicator;

determining, by the platform-specific adapter, a tag for each data record in the sub-set of data records based on a respective change indicator, each tag comprising one of a create tag, an update tag, and a delete tag, the create tag indicating one of that a log entry is to be created, that a process within the RPA platform has started, and that a resource within the RPA platform has started, the update tag indicating that data associated with one of a process and a resource within the RPA platform has changed, and the delete tag can indicating that one of a process and a resource within the RPA platform has finished; and transmitting, by the platform-specific adapter, a set of messages to the AP, the set of messages communicating tagged data records of the first set of data records, and the sub-set of data records.

9. The computer-readable storage media of claim 8, wherein if a hash value of a data record does not match a hash value of a corresponding stored hashed record, the data record is tagged, and is included in the sub-set of data records.

10. The computer-readable storage media of claim 8, wherein comparing hash values of data change tuples to a set of stored hash values comprises, for at least one data record, determining that the identifier of the at least one data record is included in the set of stored hash values.

11. The computer-readable storage media of claim 8, wherein the set of data records is received during a cycle, and the set of stored hash values correspond to data records received in an immediately preceding cycle.

12. The computer-readable storage media of claim 8, wherein hash values are provided using a hash function.

13. The computer-readable storage media of claim 8, wherein the platform-specific adaptor is specific to the RPA platform, and the AP communicates with multiple RPA platforms.

14. The computer-readable storage media of claim 8, wherein a unified automation platform (UAP) comprises the AP.

15. A system, comprising:
one or more processors; and
a computer-readable storage device coupled to the one or more processors and having instructions stored thereon which, when executed by the one or more processors, cause the one or more processors to perform operations for reducing data flow between of an autonomic platform (AP), and one or more robotic process automation (RPA) platforms, the operations comprising:

receiving, by a platform-specific adapter of the AP, a set of data records from a RPA platform of a plurality of RPA platforms the AP interacts with;

providing, by the platform-specific adapter, and from the set of data records, a first set of data records comprising tagged data records, and a second set of data records comprising untagged data records;

for each data record in the second set of data records, providing a data change tuple comprising an identifier, and a hash value;

providing a sub-set of data records from the second set of data records based on comparing one or more hash values of data change tuples to a set of stored hash values, the sub-set of data records comprising fewer data records than the second set of data records, and each data record in the sub-set of data records comprising a change indicator;

determining, by the platform-specific adapter, a tag for each data record in the sub-set of data records based on a respective change indicator, each tag comprising one of a create tag, an update tag, and a delete tag, the create tag indicating one of that a log entry is to be created, that a process within the RPA platform has started, and that a resource within the RPA platform has started, the update tag indicating that data associated with one of a process and a resource within the RPA platform has changed, and the delete tag can indicating that one of a process and a resource within the RPA platform has finished; and transmitting, by the platform-specific adapter, a set of messages to the AP, the set of messages communicating tagged data records of the first set of data records, and the sub-set of data records.

16. The system of claim 15, wherein if a hash value of a data record does not match a hash value of a corresponding stored hashed record, the data record is tagged, and is included in the sub-set of data records.

17. The system of claim 15, wherein comparing hash values of data change tuples to a set of stored hash values comprises, for at least one data record, determining that the identifier of the at least one data record is included in the set of stored hash values.

18. The system of claim 15, wherein the set of data records is received during a cycle, and the set of stored hash values correspond to data records received in an immediately preceding cycle.

19. The system of claim 15, wherein hash values are provided using a hash function.

20. The system of claim 15, wherein the platform-specific adaptor is specific to the RPA platform, and the AP communicates with multiple RPA platforms.

21. The system of claim 15, wherein a unified automation platform (UAP) comprises the AP.

* * * * *